United States Patent [19]

Kampmann et al.

[11] 4,138,908

[45] Feb. 13, 1979

[54] APPARATUS FOR THE DRESSING (STRAIGHTENING) OF CIRCULAR-SAW BLANKS AND ESPECIALLY HOT-SAWING CIRCULAR-SAWBLADE BLANKS

[75] Inventors: Walter Kampmann; Ingo Kampmann, both of Dortmund, Fed. Rep. of Germany

[73] Assignee: Bêche & Grohs GmbH, Huckeswagen, Fed. Rep. of Germany

[21] Appl. No.: 826,967

[22] Filed: Aug. 22, 1977

[30] Foreign Application Priority Data

Aug. 25, 1976 [DE] Fed. Rep. of Germany ....... 2638161

[51] Int. Cl.$^2$ .............................................. B23D 63/18
[52] U.S. Cl. ......................................... 76/26; 72/76; 72/421
[58] Field of Search .................. 76/25 R, 26, 75, 112; 72/76, 421, 420

[56] References Cited

U.S. PATENT DOCUMENTS

| 372,669 | 11/1887 | Gowen | 76/26 |
| 2,486,844 | 11/1949 | Hercik | 76/26 |

Primary Examiner—Harold D. Whitehead
Assistant Examiner—Roscoe V. Parker
Attorney, Agent, or Firm—Karl F. Ross

[57] ABSTRACT

An apparatus for the straightening (dressing or peening) of relatively large circular-sawblade blanks, especially for hot-sawing circular saw blanks, comprises a stand for a forging hammer which is provided with a pneumatic peening hammer directed upon a working point and a support which is linearly shiftable relative to the hammer. The hammer is vertically reciprocatable and the translation direction of the support is horizontal and perpendicular to the axis of the hammer. The support comprises linearly-shiftable carriage provided with a table which can be rotated about a vertical axis through at least 180° and the peening portion of the hammer is also rotatable about a vertical axis through at least 90°.

3 Claims, 2 Drawing Figures

APPARATUS FOR THE DRESSING (STRAIGHTENING) OF CIRCULAR-SAW BLANKS AND ESPECIALLY HOT-SAWING CIRCULAR-SAWBLADE BLANKS

FIELD OF THE INVENTION

The present invention relates to an apparatus or a device for the dressing (i.e. straightening) of circular-saw blanks and, especially, for the peening of hot-sawing circular saw blanks.

BACKGROUND OF THE INVENTION

Circular saw blanks and, especially, hot-sawing circular saw blanks generally are relatively large and thick and are obtained from stock following a rolling process which produces ridges, corrugations or other irregularities. These must be straightened or removed by dressing. A typical dressing process is the peening of the blank with a hammer or the like.

The circular saws which are fabricated according to the present invention are industrial circular saws, e.g. hot-sawing circular saws of the type used in metallurgical plants, rolling knolls and the like for the cutting of rolled or extruded profiles, blooms ingots, billets or blocks, and other metallurgical intermediate products.

A circular saw blank for use in the hot sawing of metallurgical products generally is constituted as a heavy sheet-metal body having a diameter of up to 2000 mm. and a thickness of up to 20 mm. or more.

Since the blank is cut from rolled sheet metal, it is obtained from the rolling process with corrugations, dislocations, bends and other irregularities which must be straightened or dressed by a straightening or dressing process.

This is important because rotary or industrial circular saws are driven at angular velocities of 2000rpm or more. Thus any irregularities, even if minor, which can result in lateral distortion of the blade can endanger operating personnel and/or lead to failure of the saw.

The dressing or straightening process has been effected hereto with the aid of mechanical hammers which are hand-held or are provided in a support frame with a stationary anvil. When a hand-held hammer is employed, it must be displaced relative to the sheet-metal circular saw blank while, when the hammer is juxtaposed in a frame with a fixed anvil, the circular saw blade must be manually displaced from two or more sides by operating personnel so that all of the irregular surfaces are ultimately shifted beneath the fixed working point of the device.

The process is thus labor-intensive and relatively expensive and practice has shown that it often is not sufficiently precise.

In fact, only when operating personnnel by hand carefully position each portion of the blank at the working location is there any significant improvement in the precision of the straightening operation. Naturally, such care by the operating personnel in holding, moving and locating the blank, increases the cost of the product markedly.

OBJECTS OF THE INVENTION

It is an object of the present invention to provide an apparatus or device for the purposes described which reduces the manipulation work required by operating personnel or which can be operated fully or partially automatically to ensure a highly precise orientation of the circular saw blank below the working location of a hammer.

Yet another object of this invention is to provide an apparatus for carrying out a straightening or dressing process on relatively large sheet metal blanks for industrial circular saws, hot-sawing saws and the like which can carry out the dressing or straightening operation with higher precision than heretofore at lower labor cost.

SUMMARY OF THE INVENTION

These objects and others which will become apparent hereinafter are attained, in accordance with the present invention, in an apparatus which comprises a forging hammer stand with a vertically disposed pneumatically reciprocated forging hammer which has a working point disposed therebelow. The hammer is vertically displaceable (reciprocatable) at this working point or location.

According to the present invention, the apparatus is also provided with a circular saw blank support or table which is shiftable in translation, i.e. rectilinearly, perpendicular to the axis of the hammer with respect to the working point. Advantageously, the table is rectilinearly displaceable (in translation) in a horizontal direction for this purpose.

According to another essential feature of the invention, the table is displaceable angularly about a central vertical axis through at least 180°, while the hammer tool, i.e. the peening tip of the hammer, is provided with a dressing or straightening hammer surface which is rotatable about is vertical axis through an angle of at least 90°.

When this surface is elongated, it can thus be displaced from a position in which it is tangential to the rotation circle of the table to a position in which it lies substantially radially.

According to a further feature of the invention, the impact energy which is transformed into deformation work in the strightening of the blank is adjustable.

The present invention is based upon the fact that, when the workpiece support carriage can be displaced in translation in the aforedescribed way and, in addition, the table carried by this carriage is rotatable, every point on the surface of the circular saw blank can be displaced eventually beneath the impact surface of the hammer provided the translation on movement or mobility is at least equal to the maximum radius or diameter of the blank. Because every point of the blank can be disposed beneath the impact surface and the regions of the blank can be progressively advanced radially and angularly beneath the impact surface in increments as small as is desired, a highly precise straightening of the blank can be effected.

The high precision is further ensured by the fact that the hammer or peening surface is itself rotatable about a vertical axis.

Thus not only is the impact at any particular location selectable at will, but the orientation of the peening surface at any location can be chosen to best suit the requirements.

Furthermore, the direction in which any deformation or distortion of the blank may run, may be followed by the sequence of impacts with ease.

Not only is the apparatus of the present invention relatively simple and reliable, but the apparatus is of relatively low cost.

According to a feature of the invention, the support carriage is provided with a support table (turntable) with a rotation crown (crown gear) and a blank-support or work plate which is mounted upon the crown and which can receive the blank. The latter may simply rest upon the workplate or can be clamped thereto. The carriage is provided according to the invention, with a linear servo drive system, while the turntable is provided with a rotary servo drive, the servomechanisms receiving inputs from a control station.

The support table can be fabricated of or reinforced by heavy steel construction as can the carriage and both as well as the workplate can be made from heavy steel plates. High surface pressures are thereby avoided.

The support carriage is preferably provided with rollers or balls which run in rails or guide tracks.

The hammer tool according to the invention comprises a straightening hammer surface which is cylindrical and hence elongated in the region at which it contacts the workpiece. It has been found to be advantageous to provide such a hammer surface so as to be interchangeable with a ball hammer surface, i.e. a ball-peen surface, or simply as a replaceable element on the tool.

The advantage of the cylindrical hammer surface is that it results in a more uniform peening or dressing of the blank, especially for industrial circular saws, than is otherwise possible.

BRIEF DESCRIPTION OF THE DRAWING

The above and other objects, features and advantages of the present invention will become more readily apparent from the following description, reference being made to the accompanying drawing in which.

SPECIFIED DESCRIPTION

Figure 1:
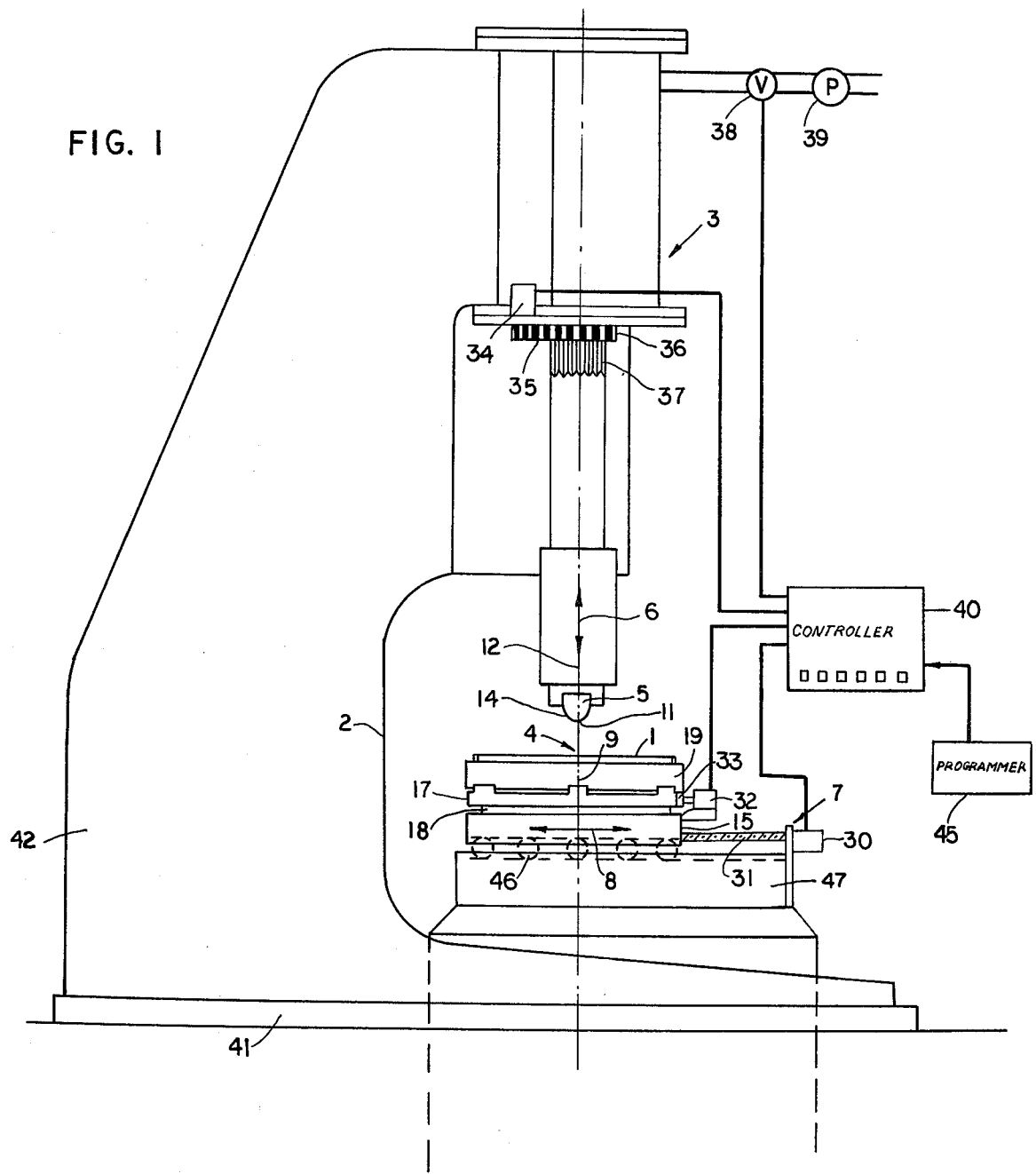
FIG. 1 is a side-elevational view, partly in diagrammatic form, of an apparatus in accordance with the present invention.

The apparatus shown in FIG. 1 for the dressing or strightening of circular saw blanks 1, especially for the dressing or straightening or hot-sawing circular saw blanks and other industrial saw blanks, comprises a forging hammer stand 2 which can comprise a base 41 and an upright arm 42, carrying a conventional compressed air-operated (pneumatic) forging hammer 3.

The forging hammer 3 has a work point 4 and is formed with a vertically reciprocatable hammer tool 5 which is driven downwardly against this working point. The direction of reciprocation of the hammer is represented by the double-headed arrow 6.

Figure 2:
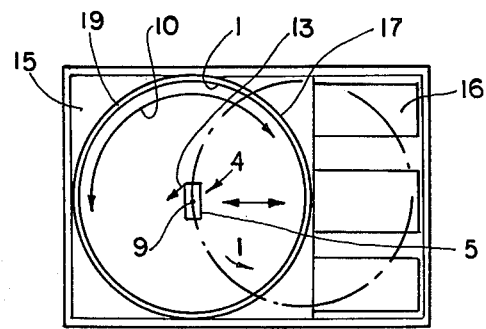
FIG. 2 is a schematic plan view of the work table of FIG. 1 showing the kinematic relationship between the workpiece support and the tool.

As a comparison of FIGS. 1 and 2 will show, the workpiece holder comprises a support 7 which is formed with a carriage 15 displaceable on rollers 46 within tracks 16 on a base 47. Consequently, the support 7 is horizontally shiftable linearly, i.e. in translation, as represented by the double-headed arrow 8. The workpiece is thereby carried to and from the location 4.

The blank 1 can be simply laid upon the support 7 or can be clamped thereon.

The support 7 is rotatable about a central vertical axis 9 through at least 180°, preferably however through 360°, as represented by the double-headed arcuate arrow 10.

The tool is formed with a replaceable hammer surface 11 which is cylindrical toward the workpiece and can be rotated about a vertical axis 12 through at least 90° as represented by the double headed arcuate arrow 13 and thus permits a cylindrical surface to assume any position between a radial position relative to the center of the support 7 to a tangential position, i.e. to a position tangential to the periphery of the blank centered on the axis 9.

The directional orientation of the hammer 11 can best be seen in FIG. 2. Its tangential location has been shown with respect to a broken line circle representing the periphery of the blank in its extreme right-hand position.

Advantageously, the surface 11 is formed as a hammer peen which is replaceable on the tool 5.

From FIG. 1 it is also apparent that the support 7 comprises, in addition to the linearly shiftable carriage 15, which can be displaced in the direction of the aforementioned arrow 8 upon the rails or track 16, a turntable 17 with a rotation crown 18 as well as a support or workplate 19 which is mounted upon this turntable. The blank 1 is carried by the workplate 19.

The carriage 15 is provided with a linear servo drive which can comprise the leadscrew 31 driven by a servo motor 30 operated by a controller diagrammatically illustrated at 40.

The turntable 17 can have its crown 18 driven by the pinion 33 of a servomotor 32 also connected to the controller 30.

In addition, the tool 5 can be rotated by its stem which can be splined as shown at 37 and hence keyed to a gear 36 driven by a pinion 35 of a servomotor 34 operated by the controller 40 to enable rotation of the surface 11 through an angle of 90° about the axis 12. Control of the impact can be effected by a valve 38 connecting the compressor 39 to the pneumatic hammer 3.

The translation movement as well as the rotary movement of the parts described can be controlled by hand, e.g. through pushbuttons on the controller 40, or by a pre-programmed set of instructions from a programmer 45.

The system illustrated in FIGS. 1 and 2 operates in the manner generally described.

A rolled blank 1 is placed upon the support or worktable 19 and under automatic control, the hammer 3 is operated while the movement of the blank is stepped radially and angularly past the location 4 with successive impacts. The process is continued until the entire surface is peened. Naturally, the increments may be as small as is necessary to effect the desired precision in the straightening or dressing of the blank.

We claim:
1. An apparatus for the dressing of circular saw blade blanks especially for hot-sawing circular saws and other industrial circular saws, comprising:
    a forging hammer stand;
    a vertically reciprocatable pneumatic forging hammer mounted on said stand and disposed above a workpoint, said hammer being formed at its lower end with a tool;
    a workpiece support disposed below said hammer and adapted to receive said blank;
    means for displacing said support linearly in translation relative to said point and below said hammer;

means for rotating said support and the blank carried thereby through an angle of at least 180° about a vertical axis;

means for rotating said tool through an angle of at least 90° about a vertical tool axis;

a carriage horizontally displaceable relative to said stand and said location;

a turntable on said carriage rotatable through at least 180° and formed with a rotating crown; and a workplate carrying said blank and disposed upon said table, said tool being formed with a replaceable peen having a cylindrical surface engageable with said blank.

2. The apparatus defined in claim 1, further comprising a first servo means operated by a controller for linearly displacing said carriage and second servo means operated by said controller for rotatatively displacing said turntable.

3. The apparatus defined in claim 1, further comprising means for controlling the impact of said hammer against said blank.

* * * * *